(12) United States Patent
Dollfus et al.

(10) Patent No.: US 10,838,097 B2
(45) Date of Patent: Nov. 17, 2020

(54) BOREHOLE SIZE DETERMINATION DOWNHOLE

(71) Applicant: Schlumberger Technology Corporation, Sugar Land, TX (US)

(72) Inventors: Hadrien Dollfus, Yokohama (JP); Henri-Pierre Valero, Paris (FR); Jean-Christophe Auchere, Clamart (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 258 days.

(21) Appl. No.: 15/970,924

(22) Filed: May 4, 2018

(65) Prior Publication Data

US 2019/0339411 A1 Nov. 7, 2019

(51) Int. Cl.
*E21B 47/085* (2012.01)
*G01V 1/40* (2006.01)
*G01V 1/50* (2006.01)

(52) U.S. Cl.
CPC ............ *G01V 1/50* (2013.01); *G01V 2210/62* (2013.01)

(58) Field of Classification Search
CPC ... E21B 47/08; E21B 47/085; G01V 1/40–52; G01V 2210/62
See application file for complete search history.

(56) References Cited

U.S. PATENT DOCUMENTS

| | | | |
|---|---|---|---|
| 5,354,956 A | 10/1994 | Orban et al. | |
| 5,469,736 A * | 11/1995 | Moake | G01B 17/00 73/152.58 |
| 5,638,337 A | 6/1997 | Priest | |
| 5,737,277 A * | 4/1998 | Priest | G01V 11/005 367/27 |
| 6,038,513 A * | 3/2000 | Varsamis | E21B 47/082 702/6 |
| 6,065,219 A * | 5/2000 | Murphey | E21B 44/00 33/544 |
| 2005/0283315 A1* | 12/2005 | Haugland | E21B 47/082 702/6 |
| 2016/0312603 A1* | 10/2016 | Gottlieb | E21B 47/095 |
| 2017/0322332 A1* | 11/2017 | Cooper | G01V 1/306 |
| 2020/0190974 A1* | 6/2020 | Manders | G01V 11/005 |

FOREIGN PATENT DOCUMENTS

EP       3147449 A1      3/2017
WO   WO2018038712 A1    3/2018

* cited by examiner

*Primary Examiner* — Nguyen Q. Ha

(57) ABSTRACT

Methods and apparatus pertaining to determining shape and size of a borehole at a depth within a subterranean formation using ultrasonic measurements obtained by a downhole tool at four different azimuthal locations corresponding to four mutually orthogonal directions extending radially from a central axis of the downhole tool. The measurements are indicative of a distance between a wall of the borehole and the downhole tool at each azimuthal location. The borehole shape and size are determined by estimating an ellipse approximating the borehole shape and size using the ultrasonic measurements.

16 Claims, 7 Drawing Sheets

BOREHOLE SIZE DETERMINATION DOWNHOLE

BACKGROUND OF THE DISCLOSURE

Modern petroleum drilling operations utilize various information relating to underground conditions. Such information includes the size and configuration of the borehole. Other information of interest to drillers includes the porosity and density of the formation surrounding the borehole. However, the processes employed to determine these additional characteristics are subject to errors unless the borehole size and configuration information is also taken into account. Moreover, drillers can modify or correct drilling parameters based on the borehole size and configuration information.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method including determining shape and size of a borehole at a depth within a subterranean formation by taking ultrasonic measurements in the borehole with a downhole tool at four different azimuthal locations corresponding to four mutually orthogonal directions extending radially from a central axis of the downhole tool. The measurements are indicative of a distance between a wall of the borehole and the downhole tool at each azimuthal location at the depth. An ellipse approximating the borehole shape and size is estimated using ultrasonic measurements obtained at least at four different azimuthal locations at the depth.

The present disclosure also introduces an apparatus including a downhole tool operable for taking ultrasonic measurements in a borehole at four different azimuthal locations corresponding to four mutually orthogonal directions extending radially from a central axis of the downhole tool. The measurements are indicative of a distance between a wall of the borehole and the downhole tool at each azimuthal location at a corresponding depth. The downhole tool is also operable for determining shape and size of the borehole at the depth by estimating an ellipse approximating the borehole shape and size using the ultrasonic measurements obtained at the depth.

The present disclosure also introduces a computer program product including a non-transitory, tangible, computer-readable storage medium having instructions recorded thereon for causing a processor of a downhole tool to, while the downhole tool is positioned in a wellbore at a depth within a subterranean formation, obtain ultrasonic measurements in the borehole at four different azimuthal locations corresponding to four mutually orthogonal directions extending radially from a central axis of the downhole tool. The measurements are indicative of a distance between a wall of the borehole and the downhole tool at each azimuthal location at the depth. The instructions also cause the processor to estimate an ellipse approximating the borehole shape and size using the ultrasonic measurements obtained at the depth.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
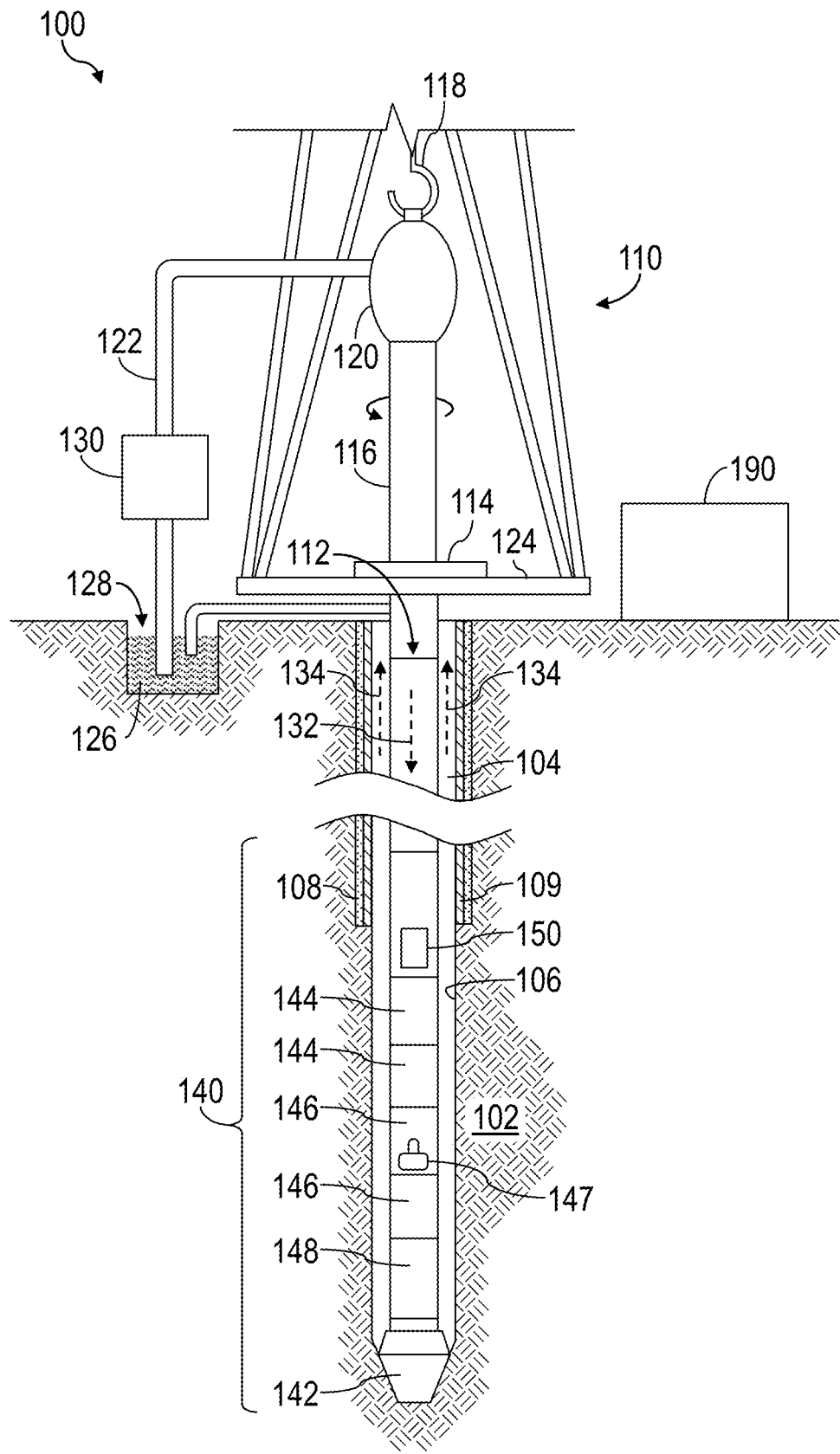
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

FIG. 1 is a schematic view of an example wellsite system 100 to which one or more aspects of the present disclosure may be applicable. The wellsite system 100 may be onshore or offshore. In the example wellsite system 100 shown in FIG. 1, a borehole 104 is formed in one or more subterranean formations 102 by rotary drilling. Other example systems within the scope of the present disclosure may also or instead utilize directional drilling. While some elements of the wellsite system 100 are depicted in FIG. 1 and described below, it is to be understood that the wellsite system 100 may include other components in addition to, or instead of, those presently illustrated and described.

As shown in FIG. 1, a drillstring 112 suspended within the borehole 104 comprises a bottom hole assembly (BHA) 140 that includes or is coupled with a drill bit 142 at its lower end. The surface system includes a platform and derrick assembly 110 positioned over the borehole 104. The platform and derrick assembly 110 may comprise a rotary table 114, a kelly 116, a hook 118, and a rotary swivel 120. The drillstring 112 may be suspended from a lifting gear (not shown) via the hook 118, with the lifting gear being coupled to a mast (not shown) rising above the surface. An example lifting gear includes a crown block affixed to the top of the mast, a vertically traveling block to which the hook 118 is attached, and a cable passing through the crown block and the vertically traveling block. In such an example, one end of the cable is affixed to an anchor point, whereas the other end is affixed to a winch to raise and lower the hook 118 and the drillstring 112 coupled thereto. The drillstring 112 comprises one or more types of tubular members, such as drill pipes, threadedly attached one to another, perhaps including wired drilled pipe.

The drillstring 112 may be rotated by the rotary table 114, which engages the kelly 116 at the upper end of the drillstring 112. The drillstring 112 is suspended from the hook 118 in a manner permitting rotation of the drillstring 112 relative to the hook 118. Other example wellsite systems within the scope of the present disclosure may utilize a top drive system to suspend and rotate the drillstring 112, whether in addition to or instead of the illustrated rotary table system.

The surface system may further include drilling fluid or mud 126 stored in a pit or other container 128 formed at the wellsite. The drilling fluid 126 may be oil-based mud (OBM) or water-based mud (WBM). A pump 130 delivers the drilling fluid 126 to the interior of the drillstring 112 via a hose or other conduit 122 coupled to a port in the rotary swivel 120, causing the drilling fluid to flow downward through the drillstring 112, as indicated in FIG. 1 by directional arrow 132. The drilling fluid exits the drillstring 112 via ports in the drill bit 142, and then circulates upward through the annulus region between the outside of the drillstring 112 and the wall 106 of the borehole 104, as indicated in FIG. 1 by directional arrows 134. In this manner, the drilling fluid 126 lubricates the drill bit 142 and carries formation cuttings up to the surface as it is returned to the container 128 for recirculation.

The BHA 140 may comprise one or more specially made drill collars near the drill bit 142. Each such drill collar may comprise one or more devices permitting measurement of downhole drilling conditions and/or various characteristic properties of the subterranean formation 102 intersected by the borehole 104. For example, the BHA 140 may comprise one or more logging-while-drilling (LWD) modules 144, one or more measurement-while-drilling (MWD) modules 146, a rotary-steerable system and motor 148, and perhaps the drill bit 142. Other BHA components, modules, and/or tools are also within the scope of the present disclosure, and such other BHA components, modules, and/or tools may be positioned differently in the BHA 140 than as depicted in FIG. 1.

The LWD modules 144 may comprise one or more devices for measuring characteristics of the formation 102, including for obtaining a sample of fluid from the formation 102. The MWD modules 146 may comprise one or more devices for measuring characteristics of the drillstring 112 and/or the drill bit 142, such as for measuring weight-on-bit, torque, vibration, shock, stick slip, tool face direction, and/or inclination, among other examples. The MWD modules 146 may further comprise an apparatus 147 for generating electrical power to be utilized by the downhole system, such as a mud turbine generator powered by the flow of the drilling fluid 126. Other power and/or battery systems may also or instead be employed. One or more of the LWD modules 144 and/or the MWD modules 146 may be or comprise at least a portion of a packer tool as described below.

The wellsite system 100 also includes a data processing system that can include one or more, or portions thereof, of the following: the surface equipment 190, control devices and electronics in one or more modules of the BHA 140 (such as a downhole controller 150), a remote computer system (not shown), communication equipment, and other equipment. The data processing system may include one or more computer systems or devices and/or may be a distributed computer system. For example, collected data or information may be stored, distributed, communicated to a human wellsite operator, and/or processed locally or remotely.

The data processing system may, individually or in combination with other system components, perform the methods and/or processes described below, or portions thereof. Methods and/or processes within the scope of the present disclosure may be implemented by one or more computer programs that run in a processor located, for example, in one or more modules of the BHA 140 and/or the surface equipment 190. Such programs may utilize data received from the BHA 140 via mud-pulse telemetry and/or other telemetry means, and/or may transmit control signals to operative elements of the BHA 140. The programs may be stored on a tangible, non-transitory, computer-usable storage medium associated with the one or more processors of the BHA 140 and/or surface equipment 190, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

Figure 2:
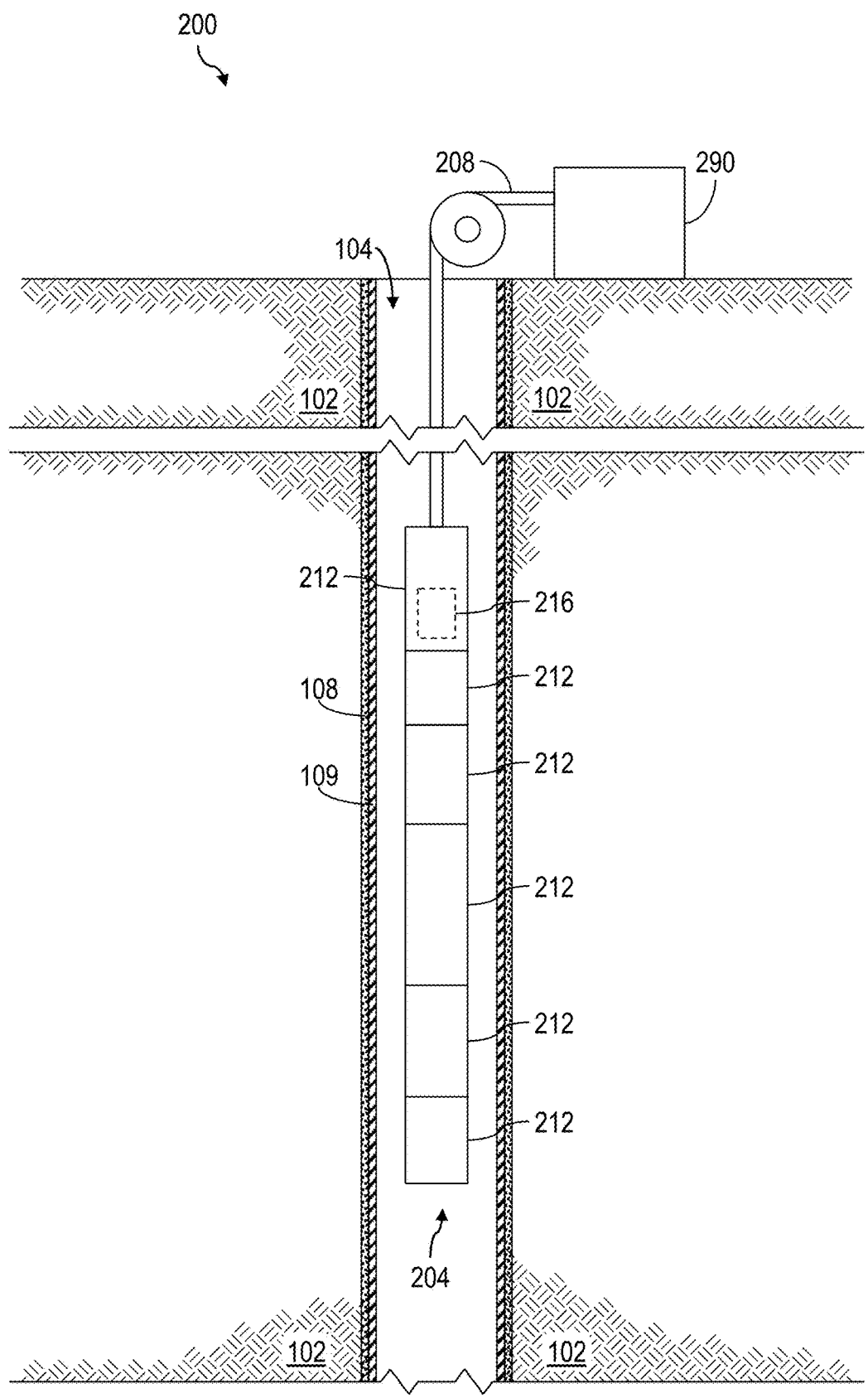
FIG. 2 is a schematic view of at least a portion of an example implementation of apparatus according to one or more aspects of the present disclosure.

FIG. 2 is a schematic view of another example wellsite system 200 to which one or more aspects of the present disclosure may be applicable. The wellsite system 200 may be onshore or offshore. In the example wellsite system 200 shown in FIG. 2, a tool string 204 is conveyed into the borehole 104 via a wireline and/or other conveyance means 208. As with the wellsite system 100 shown in FIG. 1, the example wellsite system 200 of FIG. 2 may be utilized for evaluation of the borehole 104, the cement 108 securing the casing 109 within the borehole 104, and/or the formation 102 penetrated by the borehole 104.

The tool string 204 is suspended in the borehole 104 from the lower end of the wireline 208, which may be a multi-conductor logging cable spooled on a winch (not shown). The wireline 208 may include at least one conductor that facilitates data communication between the tool string 204 and surface equipment 290 disposed on the surface. The surface equipment 290 may have one or more aspects in common with the surface equipment 190 shown in FIG. 1.

The tool string 204 and wireline 208 may be structured and arranged with respect to a service vehicle (not shown) at the wellsite. For example, the wireline 208 may be connected to a drum (not shown) at the wellsite surface, permitting rotation of the drum to raise and lower the tool string 204. The drum may be disposed on a service truck or a stationary platform. The service truck or stationary platform may further contain the surface equipment 290.

The tool string 204 comprises one or more elongated housings encasing various electronic components and modules schematically represented in FIG. 2. For example, the illustrated tool string 204 includes several modules 212, at least one of which may be or comprise at least a portion of an acoustic tool as described below. Other implementations of the downhole tool string 204 within the scope of the present disclosure may include additional or fewer components or modules relative to the example implementation depicted in FIG. 2.

The wellsite system 200 also includes a data processing system that can include one or more, or portions thereof, of the following: the surface equipment 290, control devices and electronics in one or more modules of the tool string 204 (such as a downhole controller 216), a remote computer system (not shown), communication equipment, and other equipment. The data processing system may include one or more computer systems or devices and/or may be a distributed computer system. For example, collected data or information may be stored, distributed, communicated to a human wellsite operator, and/or processed locally or remotely.

The data processing system may, individually or in combination with other system components, perform the methods and/or processes described below, or portions thereof. For example, such data processing system may include processor capability for collecting acoustic, ultrasonic, and/or other data related to the evaluation of the cement 108 and/or the formation 102 according to one or more aspects of the present disclosure. Methods and/or processes within the scope of the present disclosure may be implemented by one or more computer programs that run in a processor located, for example, in one or more modules 212 of the tool string 204 and/or the surface equipment 290. Such programs may utilize data received from the downhole controller 216 and/or other modules 212 via the wireline 208, and may transmit control signals to operative elements of the tool string 204. The programs may be stored on a tangible, non-transitory, computer-usable storage medium associated with the one or more processors of the downhole controller 216, other modules 212 of the tool string 204, and/or the surface equipment 290, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

While FIGS. 1 and 2 illustrate example wellsite systems 100 and 200, respectively, that convey a downhole tool/string into a borehole, other example implementations consistent with the scope of this disclosure may utilize other conveyance means to convey a tool into a borehole, including coiled tubing, tough logging conditions (TLC), slickline, and others. Additionally, other downhole tools within the scope of the present disclosure may comprise components in a non-modular construction also consistent with the scope of this disclosure.

The present disclosure introduces estimating borehole shape based on four ultrasonic measurements, whether from four sensors mounted mutually orthogonally on a downhole tool, from a single sensor rotated within the borehole, or otherwise. The borehole cross section is assumed to be elliptic. However, because an ellipse has five degrees of freedom, the estimation of the ellipse utilizing the four ultrasonic measurements utilizes a minimum surface constraint. The borehole shape estimation returns the analytic expression of such ellipse, which drillers can utilize as the borehole shape.

Figure 3:
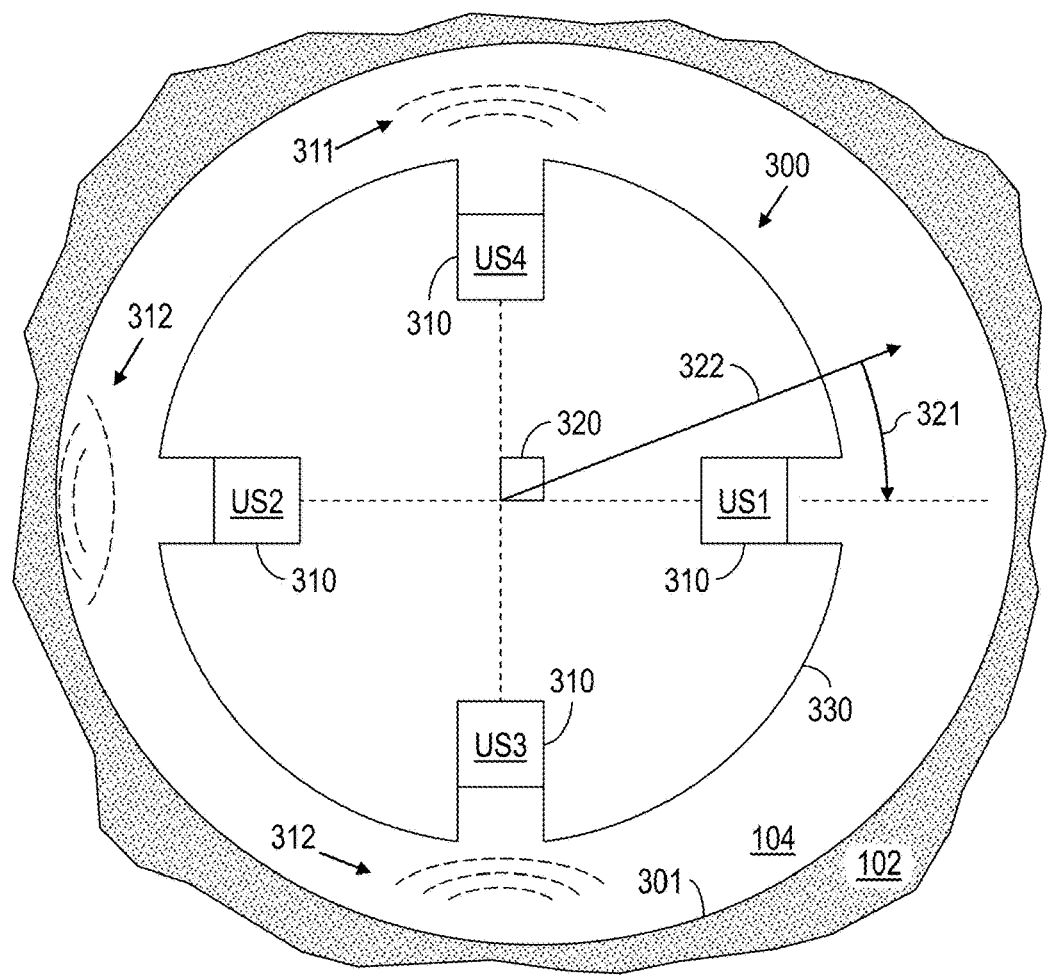
FIG. 3 is a schematic end view of at least a portion of an example implementation of apparatus according to one or more aspects of the present disclosure.
Figure 4:
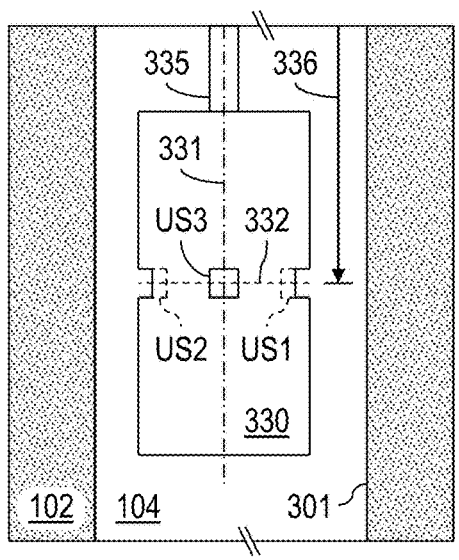
FIG. 4 is a schematic side view of the apparatus shown in FIG. 3.

FIG. 3 is a schematic end view of at least a portion of an example implementation of an acquisition system 300 that may be utilized for the borehole shape estimation according to one or more aspects of the present disclosure. FIG. 4 is a schematic side view of the example acquisition system 300. The acquisition system 300 comprises four ultrasonic transducers 310 and one magnetometer 320 carried by a downhole tool 330. The downhole tool 330 may be at least a portion of the tool string depicted in FIG. 1 or FIG. 2, or other downhole systems within the scope of the present disclosure. Wireline, drill pipe, and/or other conveyance means 335 may be utilized for conveying the downhole tool 330 within the borehole 104.

The following description is presented in the context of the acquisition system 300 shown in FIGS. 3 and 4, including the four ultrasonic transducers 310. However, aspects of the following description are also applicable or readily adaptable to other acquisition systems that may also be utilized for borehole shape estimation, such as acquisition systems utilizing a single transducer that the downhole tool 330 and/or conveyance means 335 rotates within the borehole 104. Thus, for the sake of clarity, it is assumed that the reader will recognize that the following description is not limited to implementations utilizing the four transducers 310, and that fewer transducers may be utilized.

As depicted in FIGS. 3 and 4, the transducers 310 are positioned as orthogonal pairs about the central axis 331 of the downhole tool 330 and within a cross-sectional plane 332 orthogonal to the axis 331. The transducers 310 may fire simultaneously, thus permitting access to information about the wall 301 of the borehole 104 at a fixed depth 336 in four directions. Each transducer 310 may be recessed inside the downhole tool 330, such as for physical protection against the borehole wall 301 and/or drilling cuttings.

The transducers 310 may discernable by corresponding names or addresses, such as a first ultrasonic sensor US1, a second ultrasonic sensor US2 opposite the central axis 331 from US1, and third and fourth ultrasonic sensors US3 and US4 opposite the central axis 331 and orthogonal to US1 and US2. The relative position of the acquisition system 300 in the borehole 104 is obtained from the magnetometer 320. For example, the magnetometer may generate a signal indicative of its magnetic tool face (MTF), which is the angle 321 between magnetic north 322 and US1.

The distances $r_1$, $r_2$, $r_3$, and $r_4$ of the corresponding sensors US1, US2, US3, and US4 from the central axis 331 may be the same for the diametrically opposed ones of the transducers 310, such that $r_1=r_2$ and $r_3=r_4$. Such distances may be the same (i.e., $r_1=r_2=r_3=r_4$) or different (i.e., $r_1=r_2 \neq r_3=r_4$) for the diametric pairs. However, the distances $r_1$, $r_2$, $r_3$, and $r_4$ may be chosen differently (such as $r_1=r_2=r_3=r_4$ or $r_1 \neq r_2 \neq r_3 \neq r_4$ (or any other configuration) as long as each of the distances $r_1$, $r_2$, $r_3$, and $r_4$ is known.

The borehole 104 may be considered in-gage when its diameter is within a predetermined range of the nominal diameter. For example, a borehole having a nominal diameter of about 21.6 cm may be considered in-gage when actual diameter is less than about 22.2 cm, although the maximum borehole diameter may be up to about 24.1 cm.

Acoustic data may be acquired simultaneously by each of the transducers 310 using known pulse-echo principles. For example, each transducer 310 is excited simultaneously to generate corresponding acoustic signals that propagate from the transducer 310 to the borehole 104 (as depicted in FIG. 3 by acoustic signal 311), reflect at the borehole wall 301 (as depicted in FIG. 3 by acoustic signal 312), and then propagate back toward the transducer 310 (as depicted in FIG. 3 by acoustic signal 313) for receipt. For the purposes of the present disclosure, the acoustic signals 311 are assumed to be propagating in a drilling fluid of unknown properties (e.g., velocity and density), and the borehole wall 301 is assumed to reflect enough acoustic energy back to the transducers 310. Therefore, the borehole shape/size estimation according to one or more aspects of the present disclosure does not depend on a hypothesis about the drilling fluid.

Figure 5:
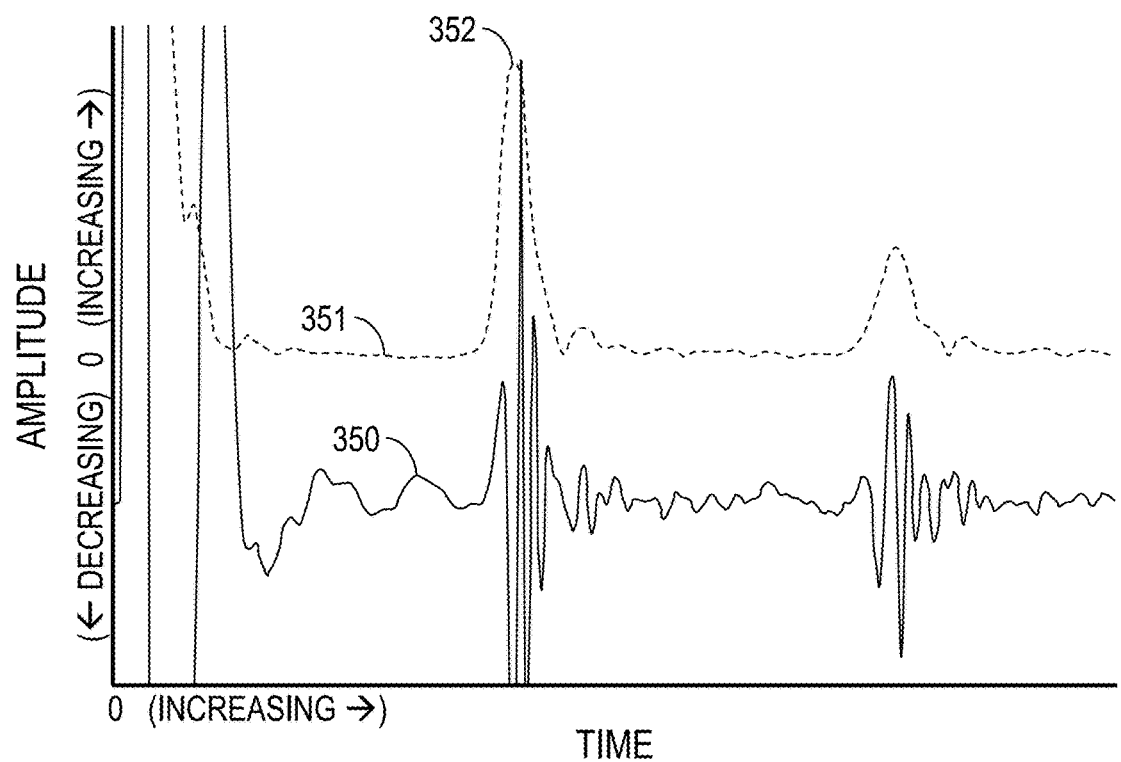
FIG. 5 is a graph depicting one or more aspects pertaining to the present disclosure.

The transducers 310 may be fired regularly with an interval having an order of magnitude of the millisecond (ms), although other firing frequencies, sampling rates, and numbers of samples are also within the scope of the present disclosure. An example acoustic waveform 350 is represented in FIG. 5, in which it appears that multiple echoes could be detected due to multiple reflections from the borehole wall. FIG. 5 also depicts a corresponding envelope 351 and the first echo 352. For a given firing at a time t, the first echo 352 may be characterized in terms of position TT(t) and amplitude AMP(t). Since the detection relies on pulse-echo principles, the acoustic signal performs a two-way propagation between a given transducer 310 and the borehole wall 301 within the duration TT.

The angular position of the acquisition system 300 (e.g., MTF) may be acquired at the same or different frequency as the transducer firings. The angular position of the acquisition system 300 may, however, be decimated (e.g., by two, four, or another number), such as for memory constraints. For recorded mode processing, each ultrasonic firing is to be associated to an angular position value, so linear and/or other interpolation may be used to reconstruct missing angular position values.

Depth information may be estimated from the bit depth information recorded via surface equipment (e.g., surface equipment 190 shown in FIG. 1 or surface equipment 290 shown in FIG. 2) in combination with the relative position of the acquisition system 300 within the downhole tool string. The resolution of the time-depth conversion table obtained in such way, however, may not be precise enough to map acquired data directly to a specific depth. Thus, depth may be assigned to each acquisition system firing via linear interpolation and/or other means.

Figure 6:
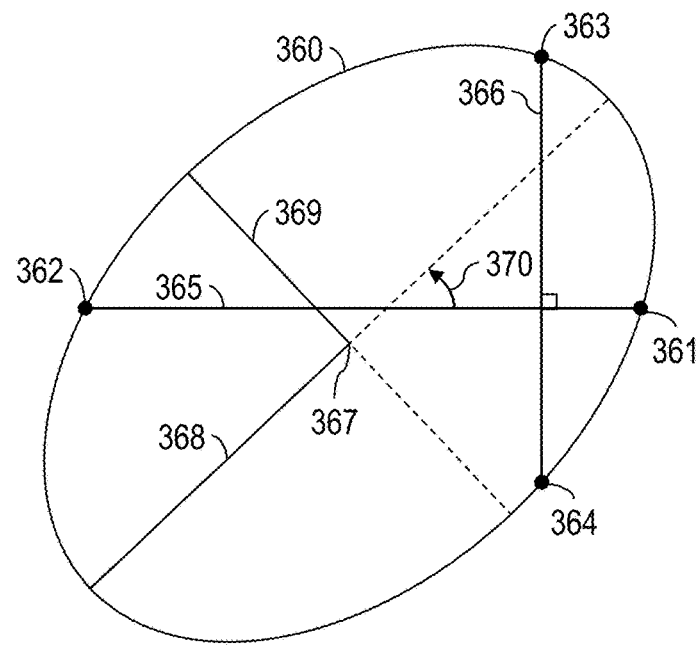
FIG. 6 is a schematic view of an ellipse approximating a borehole shape and size estimated according to one or more aspects of the present disclosure.

The acoustic signal S(t) measured by each transducer 310 is represented by two parameters, the transit time TT(t) (i.e., the duration for the two-way displacement from and back to the transducer 310) and the related amplitude AMP(t). The shape of the borehole 104 is determined from these measurements and the angular position, at the associated depth, utilizing four distinct points $M_1$, $M_2$, $M_3$, and $M_4$ terminating two orthogonal lines ($M_1M_2$ and $M_4$) to find an ellipse passing through these four points. This is depicted in FIG. 6 by the ellipse 360 passing through $M_1$, $M_2$, $M_3$, and $M_4$, the line $M_1M_2$ 365, and the line $M_3M_4$ 366. The ellipse 360 is characterized by: two coordinates for the center 367 noted ($x_C$, $y_C$) in Cartesian coordinates (or ($r_C$, $\theta_C$) in polar coordinates); the major semi-diameter 368 noted $sd_1$, the minor semi-diameter 369 noted $sd_2$, and the tilt angle 370 noted $\theta$ that indicates the major axis given modulo $\pi$ from the x-axis.

In the alternative embodiment where the downhole tool includes just one sensor, the acoustic transducer may be similar to as described elsewhere herein. The transducer may be configured in order to fire when it is positioned at a position $M_2$, $M_3$, and $M_4$ determined from a first measurement taken at a randomly-chosen point $M_1$. In another implementation, the downhole tool may take a plurality of measurements at a very high sample rate, and four points corresponding to the configurations of $M_1$, $M_2$, $M_3$, and $M_4$ may be selected from the measurement set. In either case, the measurements are not taken simultaneously. The angular position will be used to determine in which orientation the transducer fires and/or which measurement will be taken into account in the following method.

Whatever the configuration of the tool is, the tool can fire the transducers several times such that several points $M_1$, $M_2$, $M_3$, and $M_4$ are determined for a same depth. For instance, the first measurement may be obtained with the tool in a first configuration and the second measurement an instant later in a second configuration, or two sets of sensors may be used gather two measurements simultaneously. Alternatively, when there is just one sensor, for instance, it can be fired with a high sampling rate such that several combinations of points $M_1$, $M_2$, $M_3$, and $M_4$ meeting the set of conditions disclosed above may be extracted.

Since the ellipse has five degrees of freedom but just four known positions $M_1$, $M_2$, $M_3$, and $M_4$, a unique representation of the ellipse can not be directly obtained. The present disclosure introduces utilizing the additional constraint of minimum surface (i.e., circumference) of the ellipse. That is, borehole shapes can be affected by various mechanical effects, such as narrowing, fracturing, collapse, and washouts. These effects impact the cross sectional area of the borehole, and are smaller when the surface of an ellipse approximating the cross sectional shape of the borehole are smaller. Thus, for both mathematical and practical reasons, the additional constraint of minimum surface of the approximating ellipse is utilized with the four ultrasonic measurements.

Figure 7:
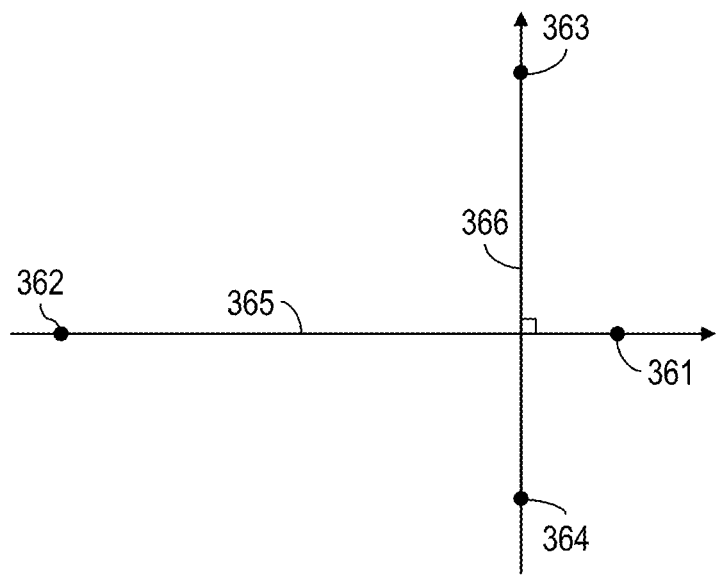
FIG. 7 is a referential utilized in estimating an ellipse approximating a borehole shape and size according to one or more aspects of the present disclosure.
Figure 8:
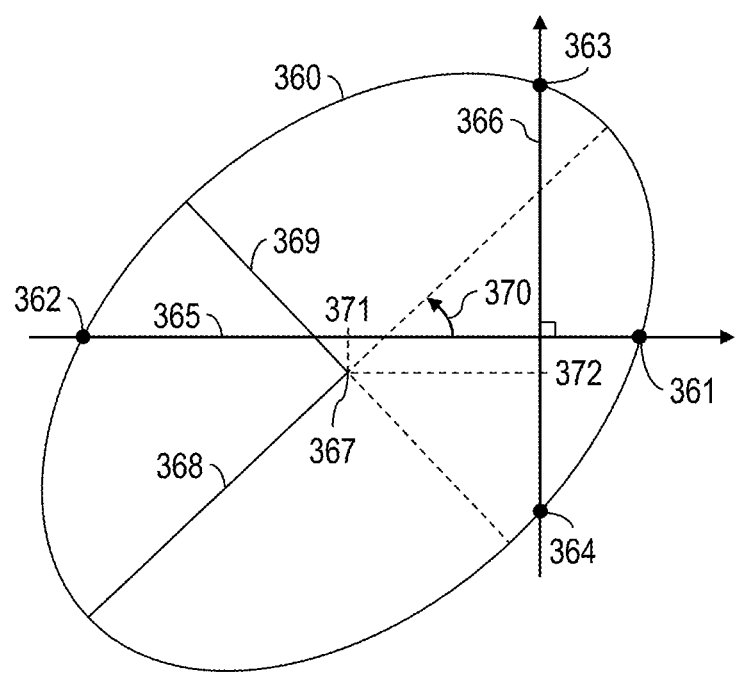
FIG. 8 is a schematic view of an ellipse approximating a borehole shape and size estimated according to one or more aspects of the present disclosure.

The process is described below in the context of an orthonormal referential, as depicted in FIG. 7, and defined by the center 380 (noted T below) at the intersection of the line $M_1M_2$ 365 and the line $M_3M_4$ 366, the horizontal axis (x-axis) set along the line $M_1M_2$ 365 and oriented positive toward $M_1$ 361, and the vertical axis (y-axis) set along the line $M_3M_4$ 366 and oriented positive toward $M_3$ 363. FIG. 8 depicts the ellipse 360 and its characteristics shown in FIG. 6 represented in referential shown in FIG. 7.

Because $M_1$ 361 and $M_2$ 362 are positioned on the x-axis, their y coordinate is null. Similarly, $M_3$ 363 and $M_4$ 364 are located on the y-axis, so their x coordinate is null. The four known positions on the ellipse 360 are therefore represented by Expression (1) set forth below.

$$M_1\begin{pmatrix}x_1\\0\end{pmatrix} M_2\begin{pmatrix}x_2\\0\end{pmatrix} M_3\begin{pmatrix}0\\y_3\end{pmatrix} M_4\begin{pmatrix}0\\y_4\end{pmatrix} \tag{1}$$

where: $x_1$ is the x coordinate for $M_1$ 361;
$x_2$ is the x coordinate for $M_2$ 362;
$y_3$ is the y coordinate for $M_3$ 363; and
$y_4$ is the y coordinate for $M_4$ 364.

Because the horizontal axis of referential is oriented toward $M_1$ 361, and the vertical axis of referential is oriented toward $M_3$ 363, Expression (1) may be as set forth below in Expression (2).

$$x_1 \geq 0 \quad x_2 \leq 0$$

$$y_3 \geq 0 \quad y_4 \leq 0 \qquad (2)$$

The transducers 310 are recessed inside the downhole tool 330, as depicted in FIG. 3. Thus, the borehole wall 301 cannot touch the emitting part of the transducers 310, leading to the conditions set forth below in Equations (3)-(6).

$$x_1 > 0 \qquad (3)$$

$$x_2 < 0 \qquad (4)$$

$$y_3 > 0 \qquad (5)$$

$$y_4 < 0 \qquad (6)$$

In referential, the Cartesian equation P(x,y) of the ellipse satisfying the general conic equation described by six real coefficients A, B, C, D, E, and F is as set forth below in Equation (7).

$$P(x,y) = Ay^2 + Bxy + Cx^2 + Dy + Ex + F = 0, (A,B,C,D,E,F) \qquad (7)$$

Because is an ellipse, the additional constraint to distinguish it from a parabola or hyperbola is as set forth below in Equation (8).

$$m = B^2 4AC < 0 \qquad (8)$$

When AC=0, Equation (8) becomes m=$B^2$<0, which cannot be satisfied because B is a real number according to Equation (7). Thus, for to be an ellipse, A and C can not equal zero. Moreover, because A is not zero, Equation (7) can be normalized by A and rewritten as set forth below in Equation (9).

$$E(x, y) = \frac{P(x, y)}{A} = y^2 + \frac{B}{A}xy + \frac{C}{A}x^2 + \frac{D}{A}y + \frac{E}{A}x + \frac{F}{A} = 0 \qquad (9)$$

Equation (9) can then be expressed as set forth below in Equations (10)-(15).

$$E(x, y) = y^2 + zxy + \alpha x^2 + \beta y + \mu x + \delta = 0 \qquad (10)$$

$$z = \frac{B}{A} \qquad (11)$$

$$\alpha = \frac{C}{A} \qquad (12)$$

$$\beta = \frac{D}{A} \qquad (13)$$

$$\mu = \frac{E}{A} \qquad (14)$$

$$\delta = \frac{F}{A} \qquad (15)$$

Equation (8) can then be rewritten as set forth below in Equation (16).

$$m = B^2\ 4AC = A^2 \left[ \frac{B^2}{A^2}\ 4\frac{C}{A} \right] = A^2[z^2\ 4\alpha] < 0 \qquad (16)$$

Because A is not zero, Equation (16) can be further simplified as set forth below in Equation (17).

$$z^2 4\alpha < 0 \qquad (17)$$

The parameters $\alpha$, $\beta$, $\mu$, and $\delta$ in Equation (10) can be obtained using the Cartesian coordinates of $M_1$, $M_2$, $M_3$, and $M_4$. As per Expression (1), $M_1$ and $M_2$ are referenced by their Cartesian coordinates $$M_1 \begin{pmatrix} x_1 \\ 0 \end{pmatrix} M_2 \begin{pmatrix} x_2 \\ 0 \end{pmatrix}.$$

Because $M_1$ and $M_2$ belong to, they satisfy Equation (7) and are solution of Equations (18) and (19) set forth below.

$$M_1 \in P(x_1, 0) Cx_1^2 + Ex_1 + F = 0 \qquad (18)$$

$$M_2 \in P(x_2, 0) Cx_2^2 + Ex_2 + F = 0 \qquad (19)$$

Because C is not zero, Equations (18) and (19) can be as set forth below in Equations (20) and (21).

$$x_1^2 + \frac{E}{C}x_1 + \frac{F}{C} = 0 \qquad (20)$$

$$x_2^2 + \frac{E}{C}x_2 + \frac{F}{C} = 0 \qquad (21)$$

It appears from Equations (20) and (21) that $x_1$ and $x_2$ are two different solutions of the same second order equation, as set forth below in Equation (22).

$$x^2 + \frac{E}{C}x + \frac{F}{C} = 0 \qquad (22)$$

A second order equation of the form $x^2 - Sx + P = 0$ has two solutions, $x_1$ and $x_2$, possibly identical, such as $S = x_1 + x_2$ and $P = x_1 x_2$. Replacing S and P in Equation (22) leads to Equations (23) and (24) set forth below.

$$x_1 + x_2 = \frac{E}{C} \qquad (23)$$

$$x_1 x_2 = \frac{F}{C} \qquad (24)$$

Similarly, $M_3$ and $M_4$ are solution of Equations (25) and (26) set forth below.

$$M_3 \in P(0, y_3) Ay_3^2 + Dy_3 + F = 0 \qquad (25)$$

$$M_4 \in P(0, y_4) Ay_4^2 + Dy_4 + F = 0 \qquad (26)$$

Because A is not zero, Equations (25) and (26) can be as set forth below in Equations (27) and (28).

$$y_3^2 + \frac{D}{A}y_3 + \frac{F}{A} = 0 \qquad (27)$$

$$y_4^2 + \frac{D}{A}y_4 + \frac{F}{A} = 0 \qquad (28)$$

It appears from Equations (27) and (28) that $y_3$ and $y_4$ are two different solutions of the same second order equation, as set forth below in Equation (29).

$$Y^2 + \frac{D}{A}y + \frac{F}{A} = 0 \quad (29)$$

As above, this leads to Equations (30) and (31) set forth below.

$$y_3 + y_4 = \frac{D}{A} \quad (30)$$

$$y_3 y_4 = \frac{F}{A} \quad (31)$$

Substituting Equations (30) and (31) into Equations (13) and (15) results in Equations (32) and (33) set forth below.

$$\beta = \frac{D}{A} = (y_3 + y_4) \quad (32)$$

$$\delta = \frac{F}{A} = y_3 y_4 \quad (33)$$

Following the same approach as above, Equations (12) and (14) can be rewritten as set forth below in Equations (34) and (35).

$$\alpha = \frac{C}{A} = \frac{C}{F}\frac{F}{A} \quad (34)$$

$$\mu = \frac{E}{A} = \frac{E}{C}\frac{C}{A} \quad (35)$$

Injecting Equations (23), (24), (30) and (31) into Equations (34) and (35) then results in Equations (36) and (37) set forth below.

$$\alpha = \frac{C}{A} = \frac{y_3 y_4}{x_1 x_2} \quad (36)$$

$$\mu = \frac{E}{A} = \frac{-y_3 y_4 (x_1 + x_2)}{x_1 x_2} \quad (37)$$

Combining Equations (32)-(37) with the constraints set forth in Equations (3)-(6) results in Equations (38)-(41) set forth below.

$$\alpha = \frac{C}{A} = \frac{y_3 y_4}{x_1 x_2} > 0 \quad (38)$$

$$\beta = \frac{D}{A} = (y_3 + y_4) < 0 \quad (39)$$

$$\mu = \frac{E}{A} = \frac{-y_3 y_4 (x_1 + x_2)}{x_1 x_2} > 0 \quad (40)$$

$$\delta = \frac{F}{A} = y_3 y_4 < 0 \quad (41)$$

As presented above, the normalized ellipse Equation (10) is described by five parameters: $z$, $\alpha$, $\beta$, $\mu$, and $\delta$. Equations (38)-(41) show that the constitutive equations of the ellipse can be expressed with four parameters out of these five parameters, thus leaving just z remaining unknown. However, as described next, z can be estimated using the above-mentioned minimum ellipse surface constraint.

The surface S of an ellipse can be expressed as set forth below in Equation (42).

$$S = \frac{2\pi L}{(-m)^{3/2}} \quad (42)$$

where m is defined in Equation (8), and L is a function of the parameters, A, B, C, D, E, and F introduced in Equation (7), such as set forth below in Equation (43).

$$L = AE^2 BDE + CD^2 + F(B^2 4AC) \quad (43)$$

The parameter m can be expressed in terms of variables z, $\alpha$, $\beta$, $\mu$, and $\delta$ using Equation (16). Similarly, factorizing L by A, and because A is not equal to zero, results in Equation (44) set forth below.

$$L = A^3[\mu^2 z\beta\mu + \alpha\beta^2 + \delta(z^2 4\alpha)] \quad (44)$$

Substituting Equations (16) and (44) into Equation (42) results in Equation (45) set forth below.

$$S = \frac{2\pi A^3[\mu^2 - z\beta\mu + \alpha\beta^2 + \delta(z^2 - 4\alpha)]}{(A^2)^{3/2}(-[z^2 - 4\alpha])^{3/2}} \quad (45)$$

Because A does not equal zero, and because sgn(A) is as set forth below in Equation (46), Equation (45) can be expressed as set forth below in Equation (47).

$$\text{sgn}(A) = \frac{A^3}{(A^2)^{3/2}} = \frac{A^3}{|A|^3} \quad (46)$$

$$S = \text{sgn}(A) \frac{2\pi[\mu^2 - z\beta\mu + \alpha\beta^2 + \delta(z^2 - 4\alpha)]}{(-[z^2 - 4\alpha])^{3/2}} \quad (47)$$

The normalization of Equation (7) by A means that its coefficients are not unique. Moreover, A can take any values in *. That is, an ellipse has five degrees of freedom, while the conic equation set forth above in Equation (3.1) has six parameters. Accordingly, for the remaining description, A will be defined as a strictly positive real number, which can be translated, as set forth below in Equation (48).

$$A > 0 \quad (48)$$

Therefore sgn (A)=1, and the ellipse surface can be expressed as set forth below in Equation (49).

$$S = \frac{2\pi[\mu^2 - z\beta\mu + \alpha\beta^2 + \delta(z^2 - 4\alpha)]}{(-[z^2 - 4\alpha])^{3/2}} \quad (49)$$

Finding the parameter z that minimizes S entails solving the System of Equations (50) set forth below.

$$\begin{cases} \frac{\partial S}{\partial z} = 0 \\ \frac{\partial^2 S}{\partial z^2} > 0 \end{cases} \quad (50)$$

Minimizing this system is equivalent to solving the System of Equations (51) set forth below.

$$\begin{cases} az^3 + bz^2 + cz + d = 0 \\ 3az^2 + 2bz + c > 0 \\ a < 0 \\ c > 0 \end{cases} \quad (51)$$

where:

$$a = \delta \quad (52)$$

$$b = 2\beta\mu \quad (53)$$

$$c = 3\mu^2 + 3\alpha\beta^2 4\alpha\delta \quad (54)$$

$$d = 4\alpha\beta\mu \quad (55)$$

The System of Equations (51) is solved using classical functional analysis techniques for the functions defined above, and give a solution for the unknown parameter z of Equation (10), and the parameters $x_C$, $y_C$, $sd_1$, $sd_2$, and $\theta$ are derived from Equation (10). The results of the analysis are shown below in Table 1.

Figure 9:
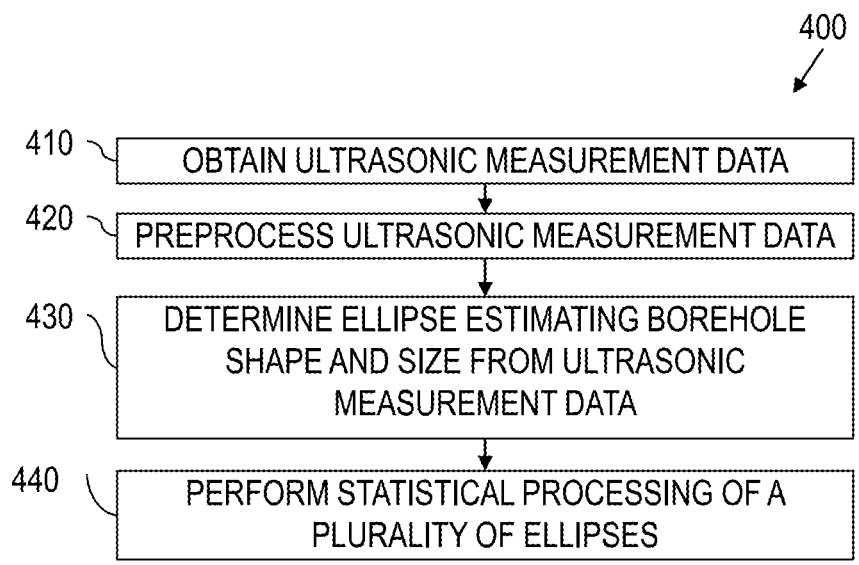
FIG. 9 is a flow-chart diagram of at least a portion of an example implementation of a method according to one or more aspects of the present disclosure.

FIG. 9 is a flow-chart diagram of at least a portion of an example implementation of a method (400) according to one or more aspects of the present disclosure. The method (400) may performed by and/or otherwise utilized in conjunction with apparatus shown in one or more of FIGS. 1-4 and/or otherwise within the scope of the present disclosure to estimate borehole shape and size as described above.

The method (400) may include obtaining (410) ultrasonic measurement data. For example, obtaining (410) the ultrasonic measurement data may be performed by and/or otherwise in conjunction with the acquisition system 300 shown in FIGS. 3 and 4 carried by a downhole wireline tool conveyed within the borehole, such as in the wireline environment depicted in FIG. 2, and/or other wireline-conveyed, ultrasonic acquisition systems comprising at least four ultrasonic transducers (for instance, four ultrasonic transducers utilized for estimating the shape and size of the borehole, but perhaps having other ultrasonic transducers for other purposes). In such implementations, the ultrasonic measurements may be obtained (410) at each of four different azimuthal locations (at each depth of investigation) via operation of a different corresponding one of the ultrasonic transducers. That is, each transducer generates ultrasonic measurement data for a corresponding one of the four

TABLE 1

| | z = 0 | | z ≠ 0 |
|---|---|---|---|
| | $0 < \alpha \leq 1$ | $\alpha > 1$ | |
| $sd_1^2$ | $\dfrac{\mu^2 + \alpha\beta^2 \; 4\alpha\delta}{4\alpha^2}$ | $\dfrac{\mu^2 + \alpha\beta^2 \; 4\alpha\delta}{4\alpha}$ | $2\dfrac{(\beta\mu \; 2\delta z)\left(1 + \alpha + \sqrt{(1+\alpha)^2 + z^2 \; 4\alpha}\right)}{3z(z^2 \; 4\alpha)}$ |
| $sd_2^2$ | $\dfrac{\mu^2 + \alpha\beta^2 \; 4\alpha\delta}{4\alpha}$ | $\dfrac{\mu^2 + \alpha\beta^2 \; 4\alpha\delta}{4\alpha^2}$ | $2\dfrac{(\beta\mu \; 2\delta z)\left(1 + \alpha \; \sqrt{(1+\alpha)^2 + z^2 \; 4\alpha}\right)}{3z(z^2 \; 4\alpha)}$ |
| $\theta$ | 0 | $\pi/2$ | $\theta = \operatorname{atan}\left(\dfrac{(1\;\alpha)\;\sqrt{(1\;\alpha)^2+z^2}}{z}\right)$ if $\alpha \neq 1$; $\operatorname{sgn}(z)\dfrac{\pi}{4}$ otherwise |
| | | | $\theta = \dfrac{1}{2}\operatorname{atan}\left(\dfrac{z}{1\;\alpha}\right)$ if $\alpha < 1$; $\operatorname{sgn}(z)\dfrac{\pi}{4}$ if $\alpha = 1$; $\dfrac{1}{2}\operatorname{atan}\left(\dfrac{z}{1\;\alpha}\right)\operatorname{sgn}(z)\dfrac{\pi}{2}$ if $\alpha > 1$ |
| $x_C$ | $\dfrac{\mu}{2\alpha}$ | | $\dfrac{2\mu + z\beta}{4\alpha \; z^2}$ |
| $y_C$ | $\dfrac{\beta}{2}$ | | $\dfrac{2\alpha\beta + z\mu}{4\alpha \; z^2}$ |

It can also be noticed that when $\alpha=1$ and $z=0$, the ellipse of minimum surface is a circle, a condition that can be used to indicate if the borehole is in-gage, and that the borehole radius is as set forth below in Equation (165).

$$R = sd_1 = sd_2 = \sqrt{\dfrac{\mu^2 + \beta^2 - 4\delta}{4}} \quad (165)$$

different azimuthal locations. The ultrasonic measurement data may be generated for the four different azimuthal locations simultaneously. The four different azimuthal locations correspond to four mutually orthogonal directions extending radially from a central axis of the downhole tool through a corresponding one of the ultrasonic transducers. For each ultrasonic transducer, the ultrasonic measurements may be indicative of a distance between a wall of the borehole and that ultrasonic transducer. The wall-to-transducer distances may establish four points through which pass an ellipse to be estimated by the method (400).

However, in other implementations, obtaining (410) the ultrasonic measurement data may be performed by and/or otherwise in conjunction with the acquisition system 300 shown in FIGS. 3 and 4 carried by a downhole while-drilling or wireline tool conveyed within the borehole, such as in the environment depicted in FIG. 1, and/or other drill-pipe-conveyed, ultrasonic acquisition systems. However, whereas the previous implementation of the acquisition system may comprise four ultrasonic transducers, the while-drilling implementation of the acquisition system may comprise at least one ultrasonic transducer. In such implementations, the downhole tool may be intentionally rotated within the borehole (e.g., via rotation of the drill string from surface, or via a rotary or other actuator of the downhole tool string) to obtain the ultrasonic measurements using the ultrasonic transducer at each of four different azimuthal locations. The ultrasonic measurements may indicative of distances between the borehole wall and the ultrasonic transducer when the ultrasonic transducer is rotationally oriented facing each sequential one of the four different azimuthal locations. In this implementation, the measurements are therefore not taken simultaneously. As above, the distances may establish four points through which pass the ellipse to be estimated by the method (400).

However, other implementations are also within the scope of the present disclosure. For example, the acquisition system may be wireline-conveyed but also rotated to obtain (410) the ultrasonic measurement data utilizing less than four transducers. Similarly, the acquisition system may be conveyed via drill string but also comprise two, three, or four transducers operable to obtain (410) the ultrasonic measurement data simultaneously or otherwise. Implementations within the scope of the present disclosure also include those in which the acquisition system is conveyed within the borehole via means other than wireline or drill string (e.g., coiled tubing, slickline, tough logging condition (TLC) pipe, and others), whether the ultrasonic measurement data is obtained (410) at each of the four different azimuthal locations simultaneously or otherwise, and whether the conveyance means and/or tool string includes means for rotating the acquisition system within the borehole.

The method (400) may also comprise preprocessing (420) the obtained (410) ultrasonic measurement data. For example, the preprocessing (420) may comprise outlier correction, such as may include estimating median absolute deviation (MAD) and rejecting data outside of 1 σ. However, other outlier correction techniques and/or other preprocessing are also within the scope of the present disclosure.

The method (400) also comprises determining (430) shape and size of the borehole at one or more depths by estimating an ellipse approximating the borehole shape and size using the ultrasonic measurements obtained (410) (and perhaps preprocessed (420)) at four different azimuthal locations at each depth. Such determination (430) is according to the aspects described above, utilizing the ultrasonic measurements obtained by not more than four transducers, obtained by just one transducer rotated to the four different azimuthal locations, or otherwise within the scope of the present disclosure. The determination (430) may also use information indicative of the angular orientation of the downhole tool within the borehole, such as generated the magnetometer 320 depicted in FIG. 3.

The determination (430) may be performed by the downhole tool, such as via a processing system of the acquisition system and/or another processing system of the downhole tool. Accordingly, information indicative of the estimated ellipse may be transmitted to surface in real-time via telemetry, such as for use by the driller. Alternatively, the information indicative of the estimated ellipse may be stored in memory of the downhole tool and/or other portion of the tool string for subsequent retrieval after returning to the wellsite surface. The estimation includes determining the parameters of the ellipse having the minimal surface and passing via the four measured points of the borehole wall.

The method may also include an optional post-processing operation including statistical processing (440). This operation is performed when a plurality of ellipses are determined based on distinct measurements for one depth. In this case, the method may include statistically processing the ellipse parameters obtained for each estimated ellipse i ($x_C^i$, $y_C^i$, $sd_1^i$, $sd_2^i$, and $\theta^i$) taken at the same depth, for determining from each of the estimated ellipse a final ellipse estimating the shape and size of the borehole at the depth. Determining the final ellipse may include outputting one resulting set of parameters and ellipse equation of the final ellipse. The statistical processing may simply comprise averaging each parameter of the set of estimated ellipse i estimated from measurements obtained during a predetermined amount of time that corresponds to acquisition at one depth or by any other appropriate statistical processing. The predetermined amount of time may be correlated to speed of the logging tool in the wellbore, or to rate of penetration (ROP) when, for instance, acquisition is done while drilling and tool speed is highly dependent on the rock type encountered. In this case, what may be transmitted to surface may be final ellipse parameters resulting from the post-processing.

Figure 11:
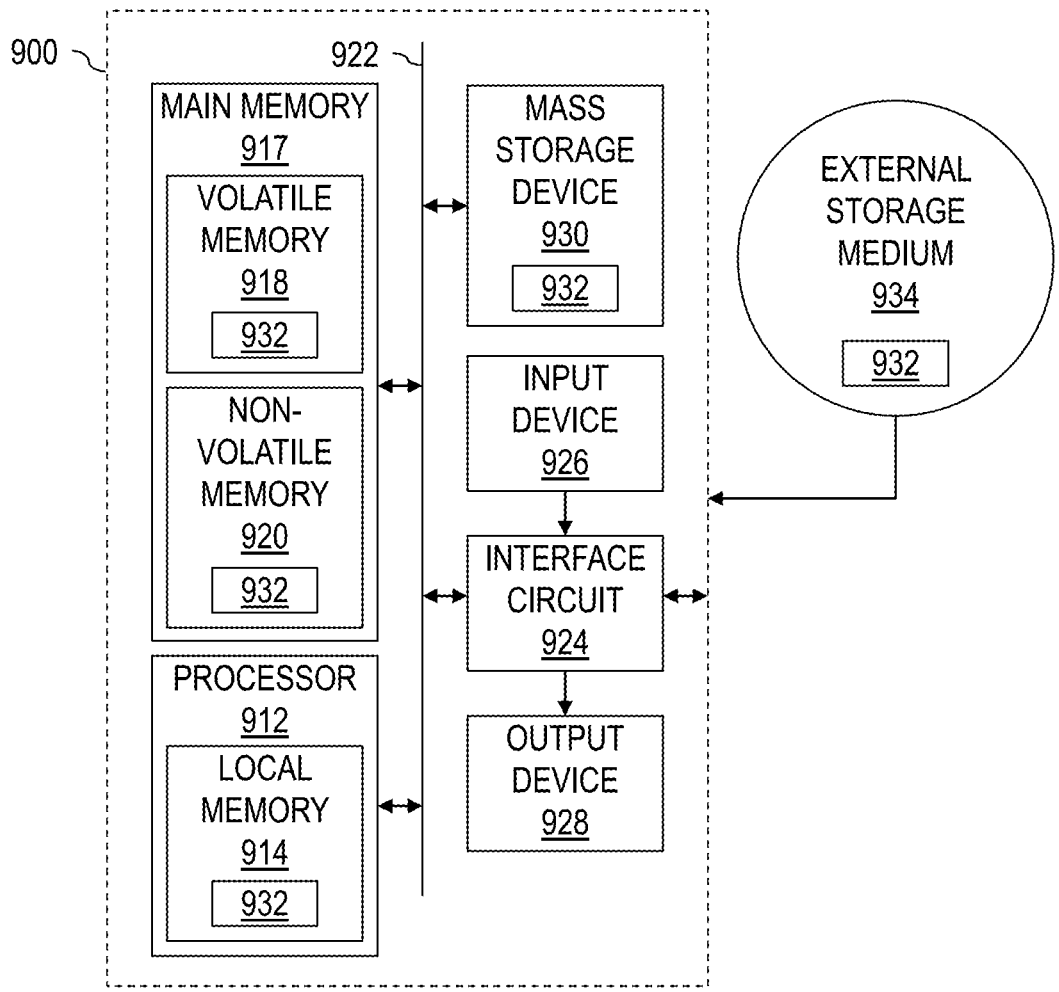
FIG. 11 is a schematic view of at least a portion of an example implementation of apparatus according to one or more aspects of the present disclosure.
Figure 10:
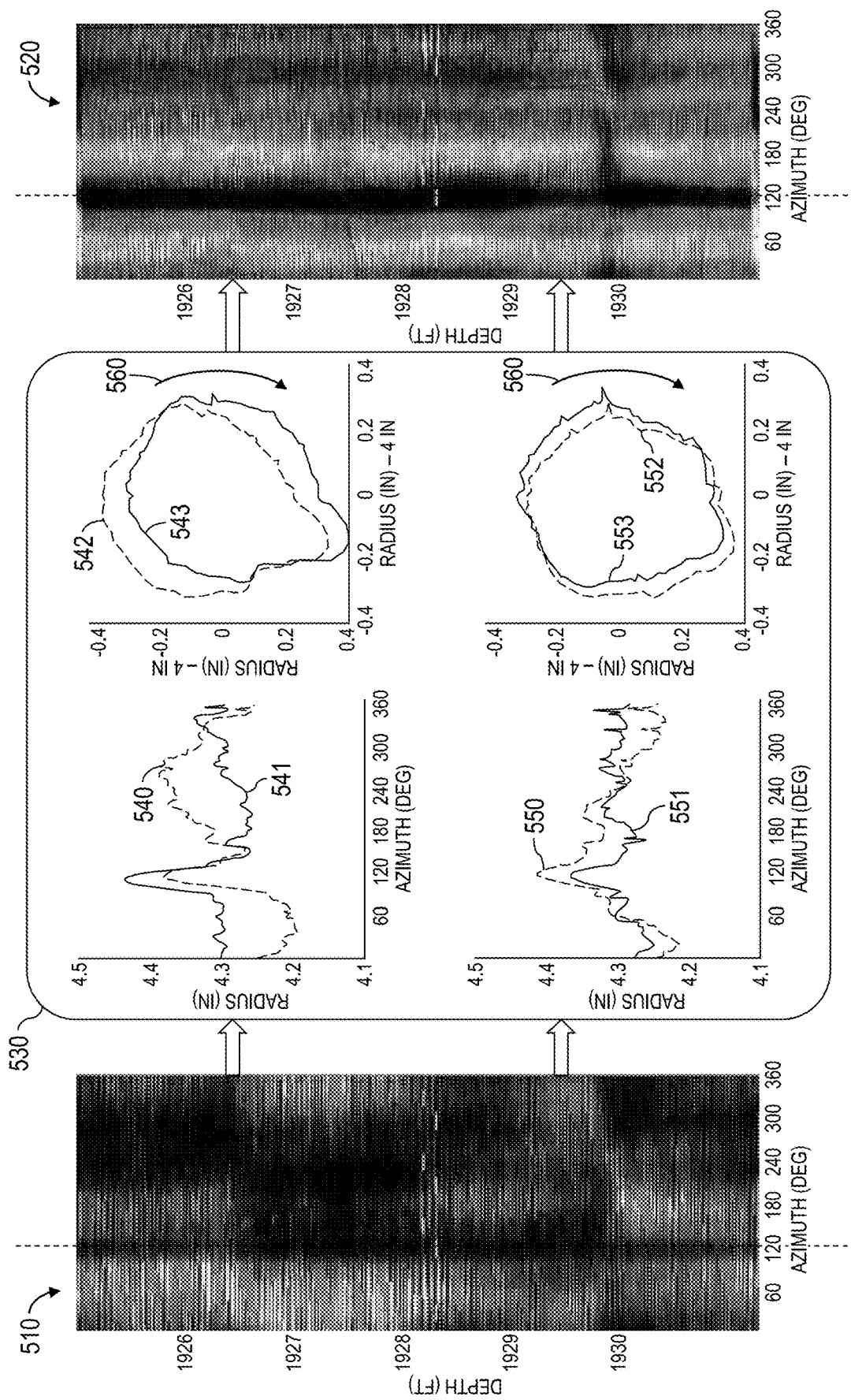
FIG. 10 includes a measured radius image, graphs depicting measured and corrected borehole radius and azimuthal profiles at two depths, and a corrected radius image according to aspects of the present disclosure.

FIG. 10 shows an example of real ultrasonic data recorded while drilling, including a measured radius image 510 obtained directly from the ultrasonic measurements, and a corrected radius image 520. The processing 530 between the measured and corrected radius images 510, 520 is depicted in FIG. 11 by graphs showing measured borehole radius 540 and corrected borehole radius 541 at a first depth and measured borehole radius 550 and corrected borehole radius 551 at a second depth. The graphs also include an azimuthal profile or polar plot 542 of the borehole at the first depth based on the measured borehole radius, a similar plot 543 of the borehole at the first depth based on the corrected borehole radius, another plot 552 of the borehole at the second depth based on the measured borehole radius, and another plot 553 of the borehole at the second depth based on the corrected borehole radius, with each plot 542, 543, 552, 553 having four inch offset for detailed cross-sectional analysis, as well as an indication 560 of the direction of azimuth. Fine borehole features such as vertical drill marks near 300°, and a 0.1 in. deep groove resembling keyhole wear near 120°, become clearly visible on the corrected radius image 520. Therefore, the corrected image 520 demonstrates some of the benefits of the estimation according to the present disclosure, such as to ease image interpretation. Another benefit of the estimation according to the present disclosure is that it may permit obtaining better images using a relatively simple mathematical method that does not require a high computing power for the resolution, and/or may permit obtaining the borehole image in real-time, perhaps directly in/by the downhole tool.

FIG. 11 is a schematic view of at least a portion of an example implementation of a processing system 900 according to one or more aspects of the present disclosure. The processing system 900 may execute example machine-readable instructions to implement at least a portion of one or more of the methods and/or processes described herein, and/or to implement a portion of one or more of the example downhole tools described herein. The processing system 900 may be or comprise, for example, one or more processors, controllers, special-purpose computing devices, servers, personal computers, personal digital assistant (PDA) devices, smartphones, internet appliances, and/or other types of computing devices. The entirety or a portion of the processing system 900 may be implemented within downhole apparatus described above, including for performing at least a portion of the method 400 shown in FIG. 9 and/or other aspects described above. For example, the acquisition system 300 shown in FIGS. 3 and 4 and at least a portion of the processing system 900 shown in FIG. 11 may be utilized in the environment of FIGS. 1 and/or 2 to estimate borehole shape/size information downhole, and such information may be recorded in memory of the downhole equipment (e.g., of the processing system 900) and/or transmitted to the surface equipment 190/290. One or more components or functions of the processing system 900 may also or instead be implemented in wellsite surface equipment, perhaps including the surface equipment 190 depicted in FIG. 1, the surface equipment 290 depicted in FIG. 2, and/or other surface equipment.

The processing system 900 may comprise a processor 912, such as a general-purpose programmable processor, for example. The processor 912 may comprise a local memory 914, and may execute program code instructions 932 present in the local memory 914 and/or another memory device. The processor 912 may execute, among other things, machine-readable instructions or programs to implement the methods and/or processes described herein. The programs stored in the local memory 914 may include program instructions or computer program code that, when executed by an associated processor, cause a controller and/or control system implemented in surface equipment and/or a downhole tool to perform tasks as described herein. The processor 912 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 912 may be in communication with a main memory 917, such as via a bus 922 and/or other communication means. The main memory 917 may comprise a volatile memory 918 and a non-volatile memory 920. The volatile memory 918 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 920 may be, comprise, or be implemented by read-only memory, flash memory, and/or other types of memory devices. One or more memory controllers (not shown) may control access to the volatile memory 918 and/or the non-volatile memory 920.

The processing system 900 may also comprise an interface circuit 924. The interface circuit 924 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 924 may also comprise a graphics driver card. The interface circuit 924 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 926 may be connected to the interface circuit 924. One or more of the input devices 926 may permit a user to enter data and/or commands for utilization by the processor 912. Each input device 926 may be, comprise, or be implemented by a keyboard, a mouse, a touchscreen, a track-pad, a trackball, an image/code scanner, and/or a voice recognition system, among other examples.

One or more output devices 928 may also be connected to the interface circuit 924. One or more of the output devices 928 may be, comprise, or be implemented by a display device, such as a liquid crystal display (LCD), a light-emitting diode (LED) display, and/or a cathode ray tube (CRT) display, among other examples. One or more of the output devices 928 may also or instead be, comprise, or be implemented by a printer, speaker, and/or other examples.

The processing system 900 may also comprise a mass storage device 930 for storing machine-readable instructions and data. The mass storage device 930 may be connected to the interface circuit 924, such as via the bus 922. The mass storage device 930 may be or comprise a floppy disk drive, a hard disk drive, a compact disk (CD) drive, and/or digital versatile disk (DVD) drive, among other examples. The program code instructions 932 may be stored in the mass storage device 930, the volatile memory 918, the non-volatile memory 920, the local memory 914, and/or on a removable storage medium 934, such as a CD or DVD.

The mass storage device 930, the volatile memory 918, the non-volatile memory 920, the local memory 914, and/or the removable storage medium 934 may each be a tangible, non-transitory storage medium. The modules and/or other components of the processing system 900 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces a method comprising determining shape and size of a borehole at a depth within a subterranean formation by: taking ultrasonic measurements in the borehole with a downhole tool at four different azimuthal locations corresponding to four mutually orthogonal directions extending radially from a central axis of the downhole tool, wherein the measurements are indicative of a distance between a wall of the borehole and the downhole tool at each azimuthal location at the depth; and estimating an ellipse approximating the borehole shape and size using ultrasonic measurements obtained at least at four different azimuthal locations at the depth.

The downhole tool may estimate the ellipse.

Estimating the ellipse may use the ultrasonic measurements and an angular orientation measurement indicative of azimuthal orientation of the downhole tool within the borehole.

The ultrasonic measurements may be obtained by an acquisition system carried by a downhole tool conveyed within the borehole, the acquisition system may comprise at least four ultrasonic transducers, and the ultrasonic measurements at each azimuthal location may be obtained via operation of a different corresponding one of the ultrasonic transducers. The measurements may be taken simultaneously.

The distances may establish four points through which the estimated ellipse passes. Estimating the ellipse may then include determining the ellipse of minimum surface passing through the four points The method may further comprise conveying the downhole tool within the borehole via wireline or via a drill string.

The ultrasonic measurements may be obtained by an acquisition system carried by a downhole tool conveyed within the borehole, the acquisition system may comprise at least one ultrasonic transducer, and the downhole tool may be intentionally rotated within the borehole to obtain the ultrasonic measurements using the ultrasonic transducer at each of the four different azimuthal locations.

The ultrasonic measurements may be obtained by an acquisition system carried by a downhole tool conveyed within the borehole, the at least four different azimuthal locations may include a randomly chosen first azimuthal position and second, third, and fourth azimuthal positions determined from the first azimuthal position, and the acquisition system may comprise an ultrasonic transducer configured in order to fire when positioned at the first, second, third, and fourth azimuthal positions.

The ultrasonic measurements may be obtained by an acquisition system carried by a downhole tool conveyed within the borehole, the acquisition system may obtain a plurality of measurements at more than the at least four azimuthal positions, and the at least four azimuthal positions may be selected from the plurality of measurements.

The method may further comprise transmitting parameters of the estimated ellipse from the downhole tool to surface equipment disposed at a wellsite surface from which the borehole extends. The parameters of the estimated ellipse may be one or more of the following: coordinates $(x_C, y_C)$ of a center of the estimated ellipse, a tilt angle $\theta$ indicating the major axis given modulo $\pi$ from the x-axis and/or a length of at least one of the major semi-diameter $sd_1$ and the minor semi-diameter $sd_2$ of the estimated ellipse.

The method may further comprise estimating a plurality of ellipses approximating the borehole shape and size at the depth, wherein each estimation uses distinct ultrasonic measurements, statistically processing one or more parameters of the plurality of ellipses, and determining from the plurality of ellipses a final ellipse approximating the borehole shape and size at the depth.

The present disclosure also introduces an apparatus comprising a downhole tool operable for: taking ultrasonic measurements in a borehole at four different azimuthal locations corresponding to four mutually orthogonal directions extending radially from a central axis of the downhole tool, wherein the measurements are indicative of a distance between a wall of the borehole and the downhole tool at each azimuthal location at a corresponding depth; and determining shape and size of the borehole at the depth by estimating an ellipse approximating the borehole shape and size using the ultrasonic measurements obtained at the depth.

The ultrasonic measurements may be obtained by an acquisition system carried by the downhole tool, the acquisition system may comprise at least four ultrasonic transducers, and the ultrasonic measurements at each azimuthal location may be obtained via operation of a different corresponding one of the ultrasonic transducers.

The ultrasonic measurements may be obtained by an acquisition system carried by the downhole tool, the acquisition system may comprise at least one ultrasonic transducer, and the downhole tool may be intentionally rotated within the borehole to obtain the ultrasonic measurements using the ultrasonic transducer at each of the four different azimuthal locations.

The downhole tool may be further operable for transmitting parameters of the estimated ellipse from the downhole tool to surface equipment disposed at a wellsite surface from which the borehole extends.

The present disclosure also introduces a computer program product comprising a non-transitory, tangible, computer-readable storage medium having instructions recorded thereon for causing a processor of a downhole tool to, while the downhole tool is positioned in a wellbore at a depth within a subterranean formation: obtain ultrasonic measurements in the borehole at four different azimuthal locations corresponding to four mutually orthogonal directions extending radially from a central axis of the downhole tool, wherein the measurements are indicative of a distance between a wall of the borehole and the downhole tool at each azimuthal location at the depth; and estimate an ellipse approximating the borehole shape and size using the ultrasonic measurements obtained at the depth.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
   determining shape and size of a borehole at a depth within a subterranean formation by:
   taking ultrasonic measurements in the borehole with a downhole tool at four different azimuthal locations corresponding to four mutually orthogonal directions extending radially from a central axis of the downhole tool, wherein the measurements are indicative of a distance between a wall of the borehole and the downhole tool at each azimuthal location at the depth; and
   estimating an ellipse approximating the borehole shape and size using ultrasonic measurements obtained at least at four different azimuthal locations at the depth,
   transmitting parameters of the estimated ellipse from the downhole tool to surface equipment disposed at a wellsite surface from which the borehole extends,
   wherein the parameters of the estimated ellipse are one or more of the following:
   coordinates $(x_C, y_C)$ of a center of the estimated ellipse
   a tilt angle $\theta$ indicating the major axis given modulo $\pi$ from the x-axis a length of at least one of the major semi-diameter $sd_1$ and the minor semi-diameter $sd_2$ of the estimated ellipse.

2. The method of claim 1, wherein the downhole tool estimates the ellipse.

3. The method of claim 1, wherein estimating the ellipse uses the ultrasonic measurements and an angular orientation measurement indicative of azimuthal orientation of the downhole tool within the borehole.

4. The method of claim 1, wherein:
the ultrasonic measurements are obtained by an acquisition system carried by a downhole tool conveyed within the borehole;
the acquisition system comprises at least four ultrasonic transducers; and
the ultrasonic measurements at each azimuthal location are obtained via operation of a different corresponding one of the ultrasonic transducers.

5. The method of claim 4, wherein the ultrasonic measurements are obtained simultaneously.

6. The method of claim 1, wherein the distances establish four points through which the estimated ellipse passes.

7. The method of claim 1, wherein estimating the ellipse includes determining the ellipse of minimum surface passing through the four points.

8. The method of claim 1, further comprising conveying the downhole tool within the borehole via wireline or via a drill string.

9. The method of claim 1, wherein:
the ultrasonic measurements are obtained by an acquisition system carried by a downhole tool conveyed within the borehole;
the acquisition system comprises at least one ultrasonic transducer; and
the downhole tool is intentionally rotated within the borehole to obtain the ultrasonic measurements using the ultrasonic transducer at each of the four different azimuthal locations.

10. The method of claim 1, wherein:
the ultrasonic measurements are obtained by an acquisition system carried by a downhole tool conveyed within the borehole;
the at least four different azimuthal locations include a randomly chosen first azimuthal position and second, third, and fourth azimuthal positions determined from the first azimuthal position; and
the acquisition system comprises an ultrasonic transducer configured in order to fire when positioned at the first, second, third, and fourth azimuthal positions.

11. The method of claim 1, wherein:
the ultrasonic measurements are obtained by an acquisition system carried by a downhole tool conveyed within the borehole;
the acquisition system obtains a plurality of measurements at more than the at least four azimuthal positions; and
the at least four azimuthal positions are selected from the plurality of measurements.

12. A method comprising:
determining shape and size of a borehole at a depth within a subterranean formation by:
taking ultrasonic measurements in the borehole with a downhole tool at four different azimuthal locations corresponding to four mutually orthogonal directions extending radially from a central axis of the downhole tool, wherein the measurements are indicative of a distance between a wall of the borehole and the downhole tool at each azimuthal location at the depth; and
estimating an ellipse approximating the borehole shape and size using ultrasonic measurements obtained at least at four different azimuthal locations at the depth,
wherein estimating an ellipse comprises estimating a plurality of ellipses approximating the borehole shape and size at the depth, wherein each estimation uses distinct ultrasonic measurements, statistically processing one or more parameters of the plurality of ellipses, and determining from the plurality of ellipses a final ellipse approximating the borehole shape and size at the depth.

13. An apparatus comprising:
a downhole tool operable for:
taking ultrasonic measurements in a borehole at four different azimuthal locations corresponding to four mutually orthogonal directions extending radially from a central axis of the downhole tool, wherein the measurements are indicative of a distance between a wall of the borehole and the downhole tool at each azimuthal location at a corresponding depth; and
determining shape and size of the borehole at the depth by estimating an ellipse approximating the borehole shape and size using the ultrasonic measurements obtained at the depth,
transmitting parameters of the estimated ellipse from the downhole tool to surface equipment disposed at a wellsite surface from which the borehole extends, wherein the parameters of the estimated ellipse are one or more of the following:
coordinates ($x_C$, $y_C$) of a center of the estimated ellipse
a tilt angle $\theta$ indicating the major axis given modulo $\pi$ from the x-axis
a length of at least one of the major semi-diameter $sd_1$ and the minor semi-diameter $sd_2$ of the estimated ellipse.

14. The apparatus of claim 13 wherein:
the ultrasonic measurements are obtained by an acquisition system carried by the downhole tool;
the acquisition system comprises at least four ultrasonic transducers; and
the ultrasonic measurements at each azimuthal location are obtained via operation of a different corresponding one of the ultrasonic transducers.

15. The apparatus of claim 13 wherein:
the ultrasonic measurements are obtained by an acquisition system carried by the downhole tool;
the acquisition system comprises at least one ultrasonic transducer; and
the downhole tool is intentionally rotated within the borehole to obtain the ultrasonic measurements using the ultrasonic transducer at each of the four different azimuthal locations.

16. The apparatus of claim 13 wherein the downhole tool is further operable for transmitting parameters of the estimated ellipse from the downhole tool to surface equipment disposed at a wellsite surface from which the borehole extends.

* * * * *